United States Patent [19]

Earle

[11] 4,301,390
[45] Nov. 17, 1981

[54] AUTOMATIC HEADLIGHT SWITCH

[76] Inventor: John L. Earle, 2905 Crane St., Lemon Grove, Calif. 92045

[21] Appl. No.: 948,820

[22] Filed: Oct. 5, 1978

Related U.S. Application Data

[63] Continuation of Ser. No. 875,083, Feb. 3, 1978, which is a continuation of Ser. No. 707,601, Jul. 7, 1976, which is a continuation of Ser. No. 573,970, May 2, 1975.

[51] Int. Cl.³ ............................................. B60Q 1/02
[52] U.S. Cl. .................................... 315/82; 315/83
[58] Field of Search ............... 315/82, 83; 307/10 LS

[56] References Cited

U.S. PATENT DOCUMENTS

| | | | |
|---|---|---|---|
| 3,389,296 | 6/1968 | Carruth | 315/82 X |
| 3,748,529 | 7/1973 | Ballou | 315/83 |
| 3,818,267 | 6/1974 | Hill et al. | 315/82 |
| 3,825,797 | 7/1974 | Maeda et al. | 315/83 |
| 3,825,798 | 7/1974 | Teich | 315/83 |
| 3,881,128 | 4/1975 | Douglas et al. | 315/83 |
| 3,909,661 | 9/1975 | Grossenbacher | 315/82 |
| 4,208,615 | 6/1980 | Jones et al. | 315/83 |

Primary Examiner—Saxfield Chatmon, Jr.

[57] ABSTRACT

An automatic headlight switch for automatically turning off headlights of a vehicle a predetermined period after the ignition switch is turned off consisting of a timer coupled to the ignition switch which is started by a transient pulse from the ignition switch being turned off which after the predetermined period is coupled to a relay solenoid for deactuation thereof opening relay contacts in series between the battery and the headlight switch. Upon turning on the headlight switch, a pulse generator coupled thereto which is triggered via a transient from the headlight switch actuates the relay solenoid and thereby applies power to the headlights through the relay contacts and the headlight switch.

17 Claims, 2 Drawing Figures

AUTOMATIC HEADLIGHT SWITCH

This is a continuation of application Ser. No. 875,083, filed Feb. 3, 1978, which is a continuation of Ser. No. 707,601, filed July 7, 1976, which is a continuation of Ser. No. 573,970, filed May 2, 1975.

BRIEF DESCRIPTION OF THE INVENTION

The present invention relates to an automatic headlight switch and more particularly to an automatic headlight switch for turning off vehicle headlights after a predetermined time from an ignition switch turn-off.

According to the invention, an automatic headlight switch is provided in which relay contacts are placed in series between the vehicle battery and the vehicle normal light switch. Upon turning on the vehicle light switch, the relay solenoid is actuated applying power through the relay contacts and the light switch to the headlights or parking lights of the vehicle. If the ignition switch is turned off and the normal light switch is left on, a transient from the ignition switch enables a timer, e.g., one minute, which after a predetermined time, is applied to a relay control circuit which inactivates or removes current from the relay solenoid, thereby turning off the headlights. It is pointed out that the terms "ignition switch" or "ignition system" include any type of vehicle ignition system and switch.

An object of the present invention is the provision of an improved automatic headlight switch.

Another object of the invention is the provision of an automatic headlight switch for turning off vehicle headlights a predetermined period after an ignition switch is turned off.

A further object of the invention is the provision of an automatic headlight switch for automatically turning vehicle headlights off with the light switch on and the ignition switch off.

Yet another object of the invention is the provision of an automatic headlight switch which can be retro-fitted to existing vehicles.

A still further object of the invention is the provision of an automatic headlight switch which has a minimal quiescent electric current drain on the vehicle battery.

Other objects and many of the attendant advantages of the present invention will be readily appreciated as the same becomes better understood by reference to the following detailed description when considered in connection with the accompanying drawings in which like reference numerals designate like parts throughout the Figures thereof and wherein:

FIG. 1 is a block diagram of the preferred embodiment of the present invention; and FIG. 2 is a schematic representation of the embodiment of FIG. 1.

DETAILED DESCRIPTION OF THE DRAWING

Figure 1:
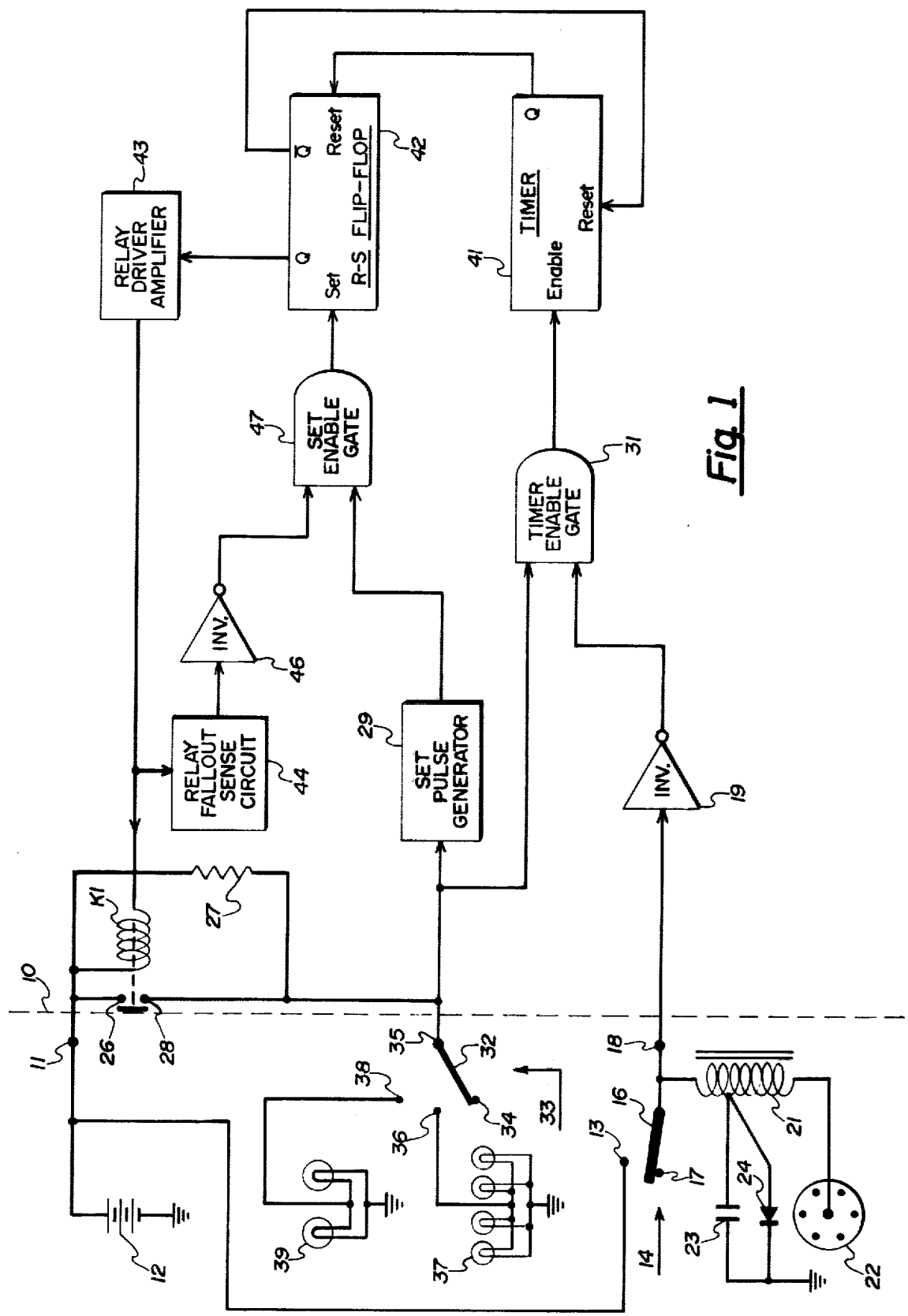

Referring to FIG. 1, terminal 11 is coupled to the positive side of battery 12 and to terminal 13 of ignition switch 14. Switch arm 16 of ignition switch 14 is shown at "off" terminal 17 and is coupled to terminal 18 which in turn is coupled to the input of inverter 19. Terminal 18 is also coupled through spark coil 21 to distributor 22. Spark coil 21 is coupled through capacitor 23 to ground and through points 24 to ground. Terminal 11 is also coupled to contact 26 of relay K1, to one side of the solenoid of relay K1, and through bleeder resistor 27 to contact 28 of relay K1, to set pulse generator 29, and to an enable input of timer enable gate 31. Bleeder resistor 27 is also coupled to switch arm 32 of light switch 33. Switch arm 32 is shown connected between "off" contact 34 of switch 33 and terminal 35. Parking light contact 36 is coupled through parking lights 37 to ground. Headlight contact 38 is connected through headlights 39 to ground.

The output of timer enable gate 31 is coupled to an enable input of timer 41 which has an output coupled to a reset input of R-S flip-flop 42. R-S flip-flop 42 has one output connected to a reset input of timer 41 and another output connected to an input of relay driver amplifier 43. Relay driver amplifier 43 has an output coupled to the solenoid of relay K1 and to an input of relay fall-out sense circuit 44. Relay fall-out sense circuit 44 has an output coupled through inverter 46 to an input of set enable gate 47. Set pulse generator 29 has an output coupled to an input of set enable gate 47.

Figure 2:
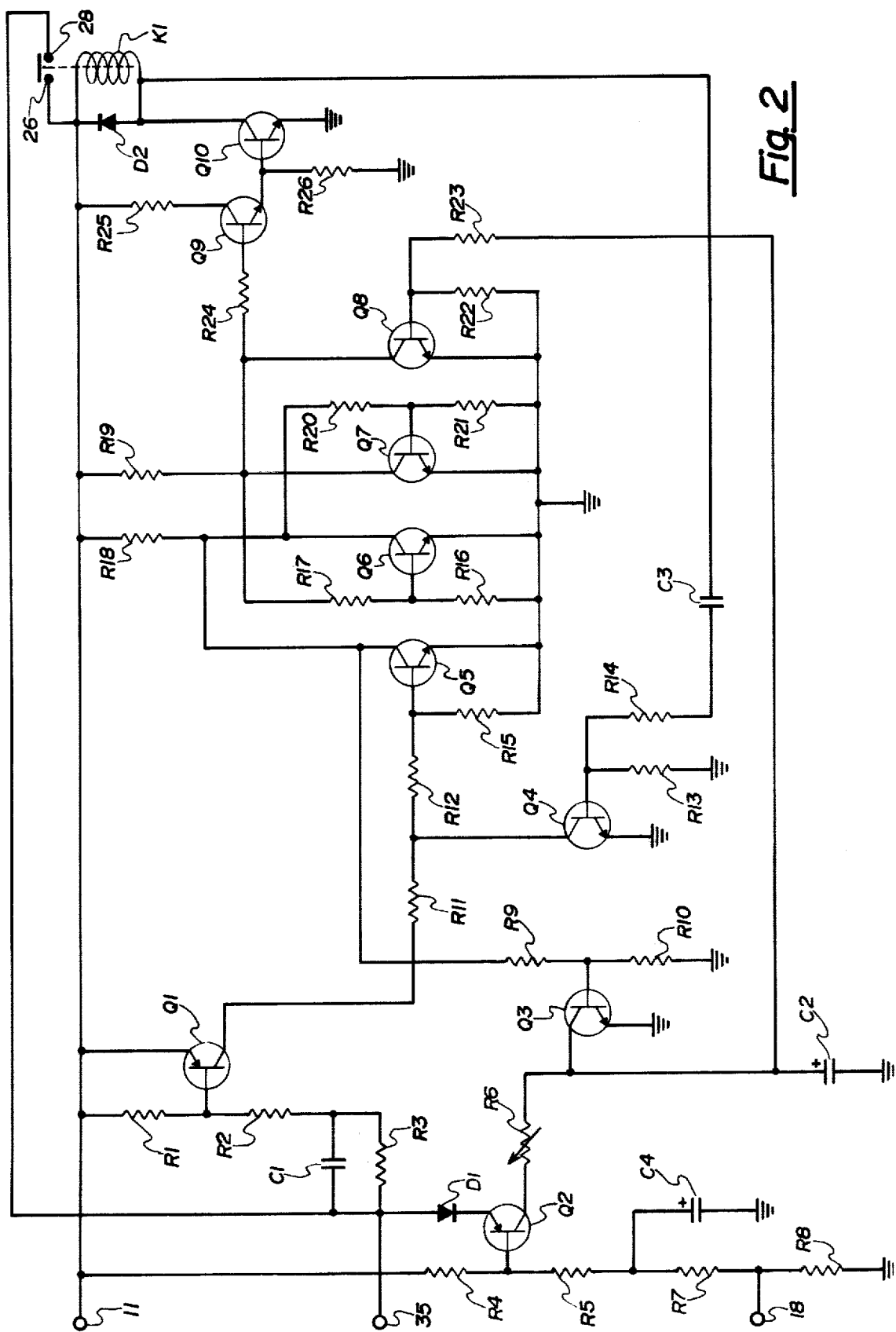

Referring to FIG. 2, input terminal 11 is coupled through resistances R1, R2, R3, in series to headlight switch terminal 35. Capacitor C1 is coupled across resistance R3. The junction of resistances R1 and R2 is coupled to the base element of transistor Q1, the emitter of which is coupled to input battery terminal 11. Battery terminal 11 is also coupled through resistances R4, R5, R7 and R8 in series to ground. The junction of resistances R4 and R5 is coupled to the base element of transistor Q2. The junction of resistances R5 and R7 is connected through capacitance C4 to ground and the junction of resistances R7 and R8 to ignition switch terminal 18. The emitter of transistor Q2 is coupled to the cathode of diode D1, the anode of which is coupled to headlight switch terminal 35. The collector of transistor Q2 is coupled through resistance R6 to the collector of transistor Q3 and through resistance R23 to the base of transistor Q8. Capacitor C2 is coupled between the collector of Q3 and ground.

The base of transistor Q3 is coupled through resistance R10 to ground and through resistance R9 to the collector of transistor Q5. The collector of transistor Q1 is coupled through resistances R11, R12 and R15 in series to the emitters of transistors Q5, Q6, Q7 and Q8 and through resistances R16, R21, R22 to the base elements of transistors Q6, Q7 and Q8, respectively. The junction of resistances R11 and R12 is coupled to the collector of transistor Q4. The base element of transistor Q3 is connected through resistance R10 to ground and through resistance R9 to the collectors of transistors Q5 and Q6. The base element of transistor Q4 is coupled through resistance R13 to ground and through resistance R14 and capacitance C3 in series to the collector of transistor Q10. The base element of transistor Q6 is connected through resistance R17 to the collector element of transistor Q7. The collector of transistor Q6 is connected through resistance R18 to battery terminal 11 and to resistance R20 to the base element of transistor Q7. The collector of transistor Q7 is connected through resistance R17 to the base element of transistor Q6, to the collector of transistor Q8, through resistance R19 to battery terminal 11 and through resistance R24 to the base element of transistor Q9. The emitter of transistor Q9 is connected through resistance R26 to ground and to the base element of transistor Q10. The emitter of transistor Q10 is connected to ground and the collector of transistor Q10 to the solenoid of relay K1 and to the anode of diode D2. The cathode of diode D2 is connected to the other side of the solenoid of relay K1 which is also connected to battery terminal 11 and to contact 26 of relay K1. Contact 28 of relay K1 is connected to the anode of diode D1 and the headlight switch terminal 35.

OPERATION

Referring back to FIG. 1, the left side of dotted line 10 illustrates the normal vehicle electrical system with contacts 26 and 28 of relay K1 in series with the battery line to switch arm 32 of light switch 33. The only other modification lies in shunting the relay contacts 26 and 28 with a high resistance 27 and coupling light switch terminal 35 to an input of set pulse generator 29 and timer enable gate 31 together with the connecting of ignition switch terminal 18 to the input of inverter 19. This hook-up would constitute the entire retrofit necessary to an existing vehicle elctrical circuit.

Quiescently, a headlight switch 33 and ignition switch 14 are shown in the "off" position. Switch arm 32 is essentiall at the battery voltage, e.g., +12 volts. If this switch is turned on, i.e., to terminal 36 or 38, the parking lights 37 or the headlights 39 have a relatively low resistance to ground which causes a negative transition pulse at the input of set pulse generator 29. At this time, set pulse generator 29 generates a pulse that is coupled through set enable gate 47 to the set side of R-S flip-flop 42. This sets flip-flop 42 and its output then goes through relay driver amplifier 43 to actuate relay K1 through its solenoid winding. Relay K1 then shorts out contacts 26 and 28 which applies power through headlight switch 33 to either the parking lights 37 or headlights 39. If ignition switch 14 is turned to the "on" position, i.e., switch arm 16 is contacting switch contact 13, timer enable gate 31 is kept off, which keeps timer 41 in an off condition. Since timer 41 is the only means for resetting flip-flop 42, it will stay on, keeping relay K1 actuated until the ignition is turned off.

When ignition switch 14 is turned to the off position, i.e., switch arm 16 is turned to "off" contact 17, timer enable gate 31 is enabled from the transient pulse through inverter 19, and the battery voltage is applied through the contacts of relay K1 to enable timer 41. After a predetermined period, typically sixty seconds, timer 41 resets flip-flop 42, which turns off relay driver amplifier 43 deactivating relay K1. At this time, relay contacts 26 and 28 are open and no power is supplied to light switch 33.

As contacts 26 and 28 open, another transient pulse is applied to set pulse generator 29 which would act to turn the system back on. To obviate this possibility, relay fall-out sense circuit 44 blocks any set pulses through set enable gate 47 until relay contacts 26 and 28 have been opened for a sufficient time for any transients to die down.

When flip-flop 42 changes from the set to the reset state, the reset side comes on and this signal is utilized to reset timer 41 so that if the operator desires to turn the lights on again, the timer will be off and the flip-flop 42 can be set again. As soon as flip-flop 42 gets another set pulse, the reset signal goes off and the timer 41 is ready to start another timing period unless the ignition is turned on, in which case it will wait until the ignition goes back off before starting this period.

Referring back to FIG. 2, correlation of FIGS. 1 and 2 is as follows: set pulse generator 29 is represented by transistor Q1 and associated circuitry; timer enable gate 31 is represented by transistor Q2 and associated circuitry; timer 41 reset input from flip-flop 42 $\bar{Q}$ output is represented by transistor Q3 and timing capacitor C2; relay fallout sense circuit 44 is represented by transistor Q4 and related circuitry set enable gate 47 is represented by transistor Q5 and associated circuitry; R-S flip-flop 42 is represented by transistor Q6 and Q7 and associated circuitry; timer 41 is represented by transistor Q8, capacitance C2 and resistance R6, and associated circuitry; and relay driver amplifier 43 is represented by transistors Q9 and Q10 and associated circuitry. Quiescently, the headlight switch 33 and the ignition switch 14 (FIG. 1) are in their "off" positions with ignition terminal 18 essentially at ground through the ignition coil 21 (FIG. 1). Capacitance C1 is previously discharged by resistance R3 and since no current flows through the headlight switch, no current is flowing through resistances R1, R2 or R3. Hence, no forward bias is on transistor Q1 and resistance R11 is at ground potential. As soon as the headlight switch is closed, capacitance C1 is brought to ground, causing current to flow in resistances R2 and R1, to the extent that transistor Q1 conducts and its collector rises to the battery voltage. Almost immediately capacitor C1 reaches its steady state charge and, assuming resistance R3 to be approximately a hundred times the ohmic value of resistance R1, the voltage across resistance R1 drops to a value below that necessary to forward bias Q1 and the collector of transistor Q1 drops to ground again. In the interim, a pulse has been applied to the base of transistor Q5 through resistances R11 and R12 which causes transistor Q5 to conduct, bringing its collector and the base of transistor Q7 to ground potential through resistance R20. Transistor Q7 therefore cuts off and its collector quickly rises causing current flow in resistance R17 which turns on transistor Q6 bringing its collector to ground potential. This redundant path for bringing resistance R20 to ground keeps transistor Q7 cut off so that the voltage on its collector stays high after the original pulse is gone.

This voltage is applied to the base of transistor Q9 through resistance R24 and brings the base of transistor Q10 into forward bias with enough current flowing in the collector of transistor Q10 to actuate relay K1. This, of course, short headlight switch to the battery terminal, turning on the headlights.

The anode of diode D1 is now at the battery voltage and the resistances R7 and R8 are essentially grounded because the ignition switch is off. Enough current flows through resistance R5 to forward bias transistor Q2, causing it to conduct and bringing its collector up with current flowing through resistance R6 to charge capacitance C2 positively. Since the collectors of transistors Q5 and Q6 are held low, transistor Q3 is cut off, allowing capacitance C2 to charge. Hence the RC time constant of capacitance C2 and resistance R6 determines the reset of timer 41 and the period thereof and this time can be varied by varying the ohmic value of resistance R6.

Eventually, resistances R23 and R22 apply enough voltage to the base of transistor Q8 to cause it to conduct. When this happens, the collector of transistor Q8 goes to ground and the junction of resistances R16 and R17 go substantially to ground, cutting off transistor Q6. The collector of transistor Q6 then rises and applies voltage through resistance R20 to the base of transistor Q7 which turns it on and brings its collector and resistance R24 to ground. This cuts off transistors Q9 and Q10 and the solenoid of relay K1 is also cut off, inactivating relay K1. The collector of transistor Q10 rises to the battery voltage and the inductance of the solenoid of relay K1 causes it to go much higher but diode D2 stops it from going much above the battery voltage. After the current dies in the solenoid of relay K1, contacts 26 and 28 first open, a pulse is created by transistor Q1, which could reset transistor Q5 again, except that transistor Q4 was conducting and the pulse is shunted to ground, thus insuring that Q5 did not turn on as the contacts opened. Transistor Q4 was turned on by the charge of capacitance C3 being applied as the collector of transistor Q10 went positive, and current flowed through resistance R14. After a fraction of a second and at least long enough for relay K1 to be fully open, the charge on capacitance C3 is discharged and transistor Q4 is cut off.

Transistor Q5 is again ready to receive another reset pulse if the light switch is turned on again. Now, with the collector of transistor Q7 low, the junction of resistances R16 and R17 is low, and transistors Q5 and Q6 are cut off with their collectors at the battery potential. This puts a high voltage at the junction of resistances R9 and R10 and transistor Q3 is conducting, which causes the charge on capacitance C2 to be discharged very rapidly. This means that a finite time, e.g., sixty seconds, will be required before transistor Q8 can be conducting to release the relay if the lights are turned on again.

Considering the case where the ignition switch is on, resistances R7, R4 and R5 are all at the battery voltage with transistor Q2 cut off so that no charging current flows through resistance R6. Resistances R22 and R23 slowly discharge capacitance C2 completely, and if relay K1 is turned on by a switch pulse, it is not turned off as long as the ignition switch is keeping transistor Q2 cut off. When the ignition switch is turned off, transistor Q2 conducts and capacitance C2 slowly charges and shuts off relay K1 about sixty seconds later. Hence, the operation of the headlight switch is normal since turning it to an on position turns on the lights because the relay pulls in, and turning it off turns the headlights off because the two are in series. However, if the light switch is left on, the relay will turn lights off in a predetermined period of time, such as sixty seconds, if the ignition is turned off.

It should be understood, of course, that the foregoing disclosure relates to only a preferred embodiment of the invention and that it is intended to cover all changes and modifications of the example of the invention herein chosen, for the purposes of the disclosure, which do not constitute departures from the spirit and scope of the invention.

The invention claimed is:

1. In a vehicle having lights therein powered by a battery through a normal light switch and an ignition switch connecting the battery to a vehicle ignition system, an automatic headlight switch system comprising:
    a relay having a solenoid and first and second contacts thereof, said relay operative for shorting together said first and second contacts upon the energization of said solenoid, said first and second contacts being connected to in serial relationship with said normal light switch and said battery;
    energizing circuit means coupled between said normal light switch and said relay solenoid, said energizing circuit means operable for energizing said solenoid upon receiving a transient pulse produced when the normal light switch is turned from an on-off position to an on position; and
    de-energizing circuit means coupled between said ignition switch and said relay solenoid, said de-energizing circuit means being operable for de-energizing said relay solenoid upon the changing of said ignition switch from an "on" state to an "off" state.

2. The automatic headlight switch of claim 1 wherein:
    said de-energizing circuit means comprises a timer means operable for delaying the de-energization of the relay solenoid a predetermined period of time after the ignition switch is changed from an "on" state to an "off" state.

3. The automatic headlight switch of claim 2 and further including:
    blocking means coupled between said relay solenoid and said energizing circuit means, said blocking means operable for blocking said energizing circuit means during any period of decreasing current in said relay solenoid, said solenoid being energized only when said normal light switch is in an on position.

4. The automatic headlight switch of claim 2 wherein:
    said de-energizing circuit means includes an enable gate having an enable input and a signal input, said enable input being coupled to said ignition switch, said enable gate having an output coupled to an input of said timer means.

5. The automatic headlight switch of claim 3 wherein:
    said energizing circuit means includes an enable gate having an enable input and a signal input, said enable input being coupled to said normal light switch and said signal input being coupled to said blocking circuit means, said enable gate having an output coupled to one input of a flip-flop circuit means, said flip-flop circuit means having a set and a re-set state, the output of said set state being coupled to said relay solenoid for energization thereof and the output of said re-set state being coupled to said timer means for controlling its output.

6. In a vehicle having lights therein powered by a battery through a normal light switch and an ignition switch connecting the battery to a vehicle ignition system, an automatic headlight switch system comprising:
    a relay having a solenoid and first and second contacts thereof, said relay operative for shorting said first and second contacts upon energization of said solenoid, said first and second contacts being connected in serial relationship with said normal light switch and said vehicle battery;
    energizing means coupled between said normal light switch and said relay solenoid, said energizing means operable for energizing said solenoid upon receiving a transient pulse produced by changing said normal light switch from an off position to an on position;
    blocking means coupled between said relay solenoid and said energizing means, said blocking means operable for blocking said energizing means during any period of decreasing current in said relay solenoid; and
    de-energizing means coupled between said ignition switch and said relay solenoid, said de-energizing means being operable for de-energizing said relay solenoid after said ignition switch is switched to an off position, said de-energizing means including a timer operable for delaying the de-energizing of the relay solenoid a predetermined period after the ignition switch is turned off.

7. The automatic headlight switch system of claim 6 wherein:

said energizing means includes an enable gate having an enable input and a signal input, said signal input being coupled to said relay solenoid and said enable input being coupled to said normal light switch, said enable gate having an output coupled to said energizing means for energizing the solenoid.

8. The automatic headlight switch system of claim 6 wherein:

said de-energizing means includes an enable gate having an enable input and a signal input, said enable input being coupled to said light switch and said signal input being connected to said ignition switch, said enable gate having an output coupled to an input of said timer.

9. In a vehicle having lights therein powered by a battery through a normal light switch and an ignition switch connecting the battery to the vehicle ignition system, an automatic headlight switch system comprising:

a relay having a solenoid and first and second contacts, said first and second contacts being connected in serial relationship with said light switch and said vehicle battery, whereby upon energization of said solenoid the first and second contacts are connected;

energizing means coupled between said light switch and said solenoid, said energizing means operable for energizing said solenoid upon changing said light switch from an off position to an on position, said energizing means comprising a relay amplifier connected to said solenoid and a flip-flop connected to said amplifier and to said light switch; and de-energizing means coupled between said ignition switch and said solenoid, said de-energizing means being operable for de-energizing said solenoid after said ignition switch is switched from an on position to an off position;

said de-energizing means including a timer connected to said light switch and to said ignition switch and reset means connected to the timer and to the flip-flop operable for delaying resetting of the flip-flop and de-energization of the amplifier and the solenoid a predetermined period after the ignition switch is turned from an on position to an off position.

10. The automatic headlight switch system of claim 9 and further including:

blocking means coupled between said solenoid and said energizing means, said blocking means operable for blocking said energizing means during any period of decreasing current in said relay solenoid.

11. The automatic headlight switch of claim 10 wherein:

said energizing means includes an enable gate having an enable input and a signal input, said enable input being coupled to said solenoid and said signal input being coupled to said light switch, said enable gate having an output coupled to said energizing means for blocking said energizing means during decreasing current in said solenoid.

12. The automatic headlight switch of claim 13 wherein:

said de-energizing means includes a timer enable gate having inputs respectively connected to the light switch and the ignition switch, said enable gate having an output coupled to an input of said timer.

13. Automatic headlight control apparatus having lights, a light switch, an ignition switch, and a power source and conductor between the power source and the lights and interrupter means having first and second conditions respectively for selectively completing and interrupting the conductor, the improvement comprising first activating means connected to the power source and the interrupter means for actuating the interrupter means, the activating means including flip-flop means connected to the interrupter means and sensing means connected to the flip-flop means and to the light switch for changing the flip-flop means and changing the interrupter means from the second condition to the first condition, when the light switch is turned from an off position to an on position, second activating means connected to the light switch and to the ignition switch and including a timer means on a reset means connected to the flip-flop means for starting the timer means upon turning the ignition switch from an on position to an off position when the light switch is in an on position or upon turning the light switch from an off position to an on position when the ignition switch is in the off position and for resetting the flip-flop means when the timer means has timed a predetermined period and thereupon changing state of the flip-flop means and changing the interrupter means to the second condition for turning the lights off after the predetermined period.

14. The automatic headlight control apparatus of claim 13 and further including:

blocking means coupled between said interrupter means and said first activating means, said blocking means operable for blocking said first activating means during any period of change in said interrupter means.

15. The automatic headlight control apparatus of claim 14 wherein:

said first activating means includes an enable gate having an enable input and a signal input, said enable input being coupled to said interrupter means and said signal input being coupled to said light switch, said enable gate having an output coupled to said flip-flop means for preventing change thereof upon operation of the interrupter means.

16. The automatic headlight control apparatus of claim 14 wherein:

said second actuating means includes an enable gate having first and second inputs, said first input being coupled to said light switch and said second input being connected to said ignition switch, said enable gate having an output coupled to said timer means.

17. The automatic headlight control apparatus of claim 13 wherein the sensing means includes pulsing means.

* * * * *